United States Patent [19]
Naito

[11] Patent Number: 5,158,408
[45] Date of Patent: Oct. 27, 1992

[54] CHUCK DEVICE

[75] Inventor: Tsutomu Naito, Takahama, Japan

[73] Assignee: NT Tool Corporation, Takahama, Japan

[21] Appl. No.: 604,407

[22] Filed: Oct. 29, 1990

Related U.S. Application Data

[63] Continuation-in-part of Ser. No. 119,457, Nov. 10, 1987, abandoned.

[51] Int. Cl.[5] .............................. B23B 31/04
[52] U.S. Cl. ................... 409/234; 279/103; 279/903
[58] Field of Search .......... 279/1 JS, 1 A, 1 N, 279/1 B, 1 ME, 46, 47, 48, 42, 43, 51-53, 103, 1 SJ, 50, 102, 96, 903; 408/239 R; 409/232-234

[56] References Cited

U.S. PATENT DOCUMENTS

| | | | |
|---|---|---|---|
| 3,521,896 | 7/1970 | Matsumoto | 279/1 L |
| 3,671,050 | 6/1972 | Andersson et al. | 279/51 X |
| 4,379,667 | 4/1983 | Yoshimoto et al. | 279/103 X |
| 4,630,980 | 12/1986 | Kubo | 279/1 TS X |
| 4,660,840 | 4/1987 | Haruki | 279/103 X |
| 4,721,423 | 1/1988 | Kubo | 279/103 X |

FOREIGN PATENT DOCUMENTS

| | | | |
|---|---|---|---|
| 41-23987 | 10/1966 | Japan . | |
| 71909 | 3/1980 | Japan | 279/2 R |
| 265205 | 11/1986 | Japan | 279/1 N |
| 265237 | 11/1986 | Japan | 279/2 R |

Primary Examiner—Larry I. Schwartz
Assistant Examiner—R. Schultz
Attorney, Agent, or Firm—Armstrong, Nikaido, Marmelstein, Kubovcik & Murray

[57] ABSTRACT

In a support device to hold a tool or a workpiece, a tightening cylinder is provided at inside with an insertion hole for a substance to be held and on an outer circumference with a taper surface, a rotary cylinder is rotatably and externally fitted to outside of the tightening cylinder through a number of rollers, the rotary cylinder is rotated thereby the rotary cylinder is moved towards diameter side of the tightening cylinder and the tightening cylinder is contracted so as to tighten the substance to be held. Since a number of strain absorbing holes are provided on the inner circumferential surface of the tightening cylinder and scattered uniformly in the axial direction and in the circumferential direction, the deflection adaptability of the tightening cylinder is high and the tightening cylinder can be contracted by a relatively small force.

3 Claims, 2 Drawing Sheets

CHUCK DEVICE

This application is a continuation-in-part of application Ser. No. 119,457 filed Nov. 10, 1987 and now abandoned.

BACKGROUND OF THE INVENTION

1) Field of the Invention

The present invention relates to a chuck device which holds a tool such as a drill or a workpiece to be processed in a machine tool.

2) Description of the Prior Art

In a chuck device of the prior art, a number of rollers are arranged in a wide range between a tightening cylinder and a rotary cylinder fitted to the tightening cylinder to install a substance to be held, such as a tool or a workpiece. The rollers do not intersect the axial line of these cylinders but make a suitable tilt angle with respect to the axial line. The rotary cylinder is rotated and each roller revolves on its axis and round the axial line in spiral form. The tightening cylinder is contracted and the substance to be held is tightened and held by the inner circumferential surface of the tightening cylinder. Because a large force is required to contract the tightening cylinder, a large force is also required to rotate the rotary cylinder.

In order to solve the problem in the prior art, a plurality of grooves in parallel to the axial line of the tightening cylinder are provided on the inner circumferential surface of the tightening cylinder.

In this construction, since the inner circumferential surface of the tightening cylinder is separated in the circumferential direction, stability of the substance to be held is deteriorated when the substance is held.

SUMMARY OF THE INVENTION

A chuck device according to this invention comprises a tightening cylinder in a hollow cylinder form deformable with elasticity in the radial direction and provided at the inside with an insertion hole having one end opened for a substance to be held and with an outer circumferential surface tapering outwardly from the insertion hole end of such tightening cylinder formed in a tapered surface. A rotary cylinder having a tapered inner circumferential surface parallel to the tapered outer surface of the tightening cylinder is arranged around the tightening cylinder, and a number of rollers are interposed between the tapered outer circumferential surface of the tightening cylinder and the tapered inner circumferential surface of the rotary cylinder with such rollers in angular torsion relation position with respect to the axis of the tightening cylinder. The rotary cylinder is rotated and moves in the axial direction of the tightening cylinder away from the insertion hole end and towards the larger diameter end of the tightening cylinder. Thus, the tightening cylinder is contracted by the rotary cylinder and angular rollers so as to tighten the substance to be held. A number of strain absorbing holes are provided on the inner circumferential surface of the insertion hole and are scattered uniformly in the axial direction and the circumferential direction of the tightening cylinder.

In the chuck device of the above-mentioned construction, the base portion of the substance to be held is inserted in the insertion hole of the tightening cylinder and the rotary cylinder is rotated, moving the rotary cylinder towards the larger diameter end of the tightening cylinder.

As a result, the tightening cylinder is contracted inwards, and the inner circumferential surface of the tightening surface is pushed against the outer circumferential surface of the substance to be held and holds such substance.

When the tightening cylinder is contracted, a number of strain absorbing holes scattered on the inner circumferential surface facilitate the contraction of the tightening cylinder. Moreover, because the number of holes do not detract from the continuity of the inner circumferential surface of the tightening cylinder, when the cylinder is tightened, the article being held is held stably.

Accordingly, an object of the invention is to provide a support device wherein a small force is sufficient to rotate the rotary cylinder, and when a substance to be held is tightened it can be held firmly.

BRIEF DESCRIPTION OF THE DRAWINGS

FIG. 1A is a view of the support device of FIG. 1 with portions broken away,

DESCRIPTION OF THE PREFERRED EMBODIMENT

Figure 1:
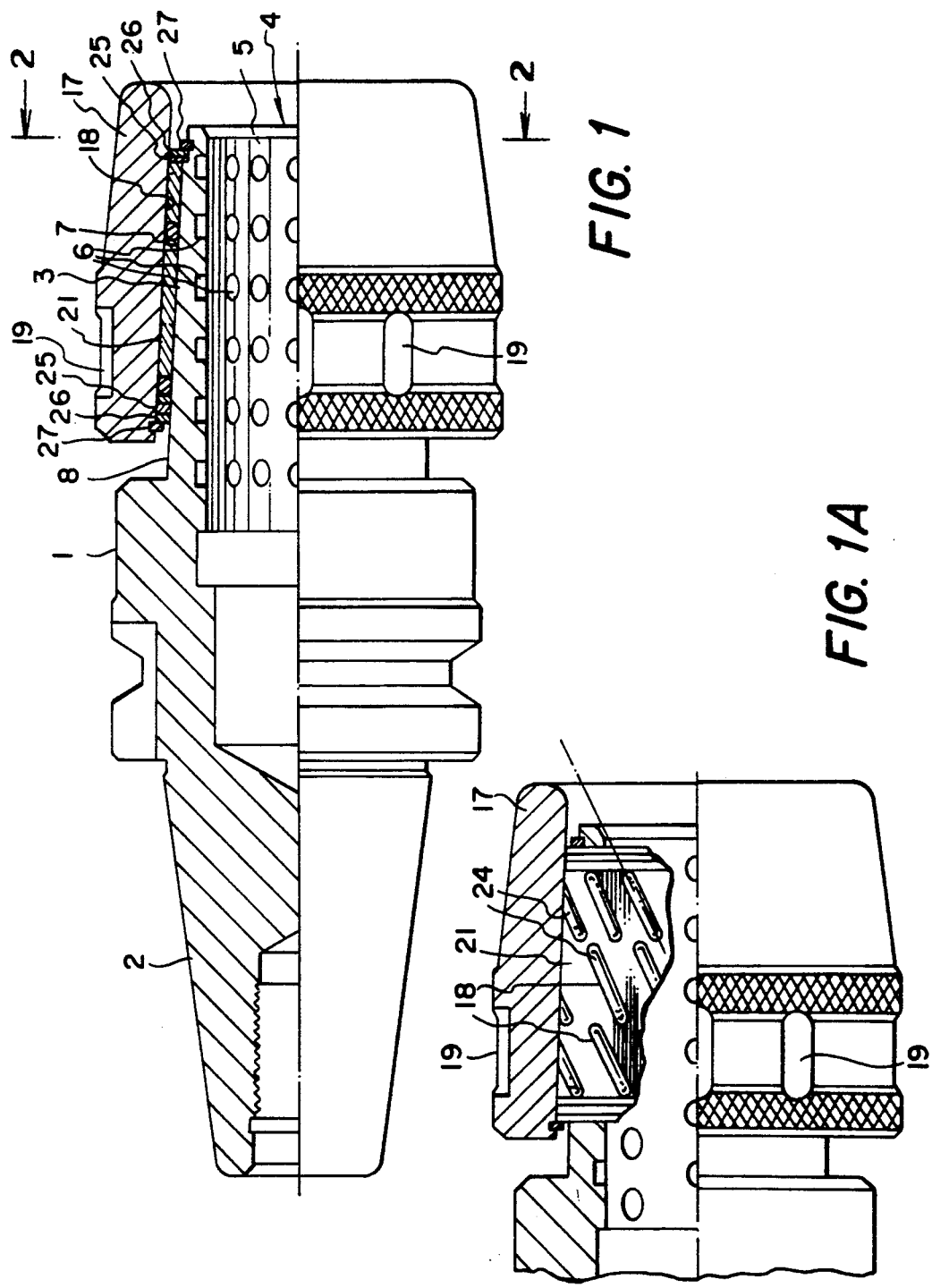
FIG. 1 is a semi-sectional view of a support device as an embodiment of the invention.

A body 1 of a chuck device is provided at a base portion (left side of FIG. 1) with a connection member 2 for mounting on a spindle of a machine tool.

A tightening cylinder 3 having a tapered outer surface 7, tapering radially outwardly from insertion hole 4 projecting into tightening cylinder 3 for insertion of a piece to be held, is integrally connected at the a top end to body 1, forming in radial direction, an elastic deformable cylinder. On a tightening surface 5, at the inner circumference of the insertion hole 4, a number of holes 6 are formed as shown in tightening surfaces 5 in rows in FIG. 1. The alternating holes 6 are uniformly arranged in the axial and circumferential directions of the tightening cylinder 3 and may be arranged in alternating axial and circumferential rows in a checkerboard pattern. The outer tapered circumferential surface 7 of the tightening cylinder 3 is larger adjacent the inner end 8 of insertion hole 4. A rotary cylinder 17 is externally fitted to outer circumferential side of the tightening cylinder 3. The inner circumferential surface 18 of the rotary cylinder 17 is tapered and slanted parallel to the outer tapered circumferential surface 7 of the tightening cylinder 3.

A spanner-holding groove 19 is formed on an outer circumferential surface of the rotary cylinder 17. A guide cylinder 21, FIGS. 1 and 1A, is interposed between the tightening cylinder 3 and the rotary cylinder 17, and a plurality of guide holes for rollers 24 are angularly disposed with respect to the axis of the tightening cylinder forming a birdcage-like shape roller cage as is well known.

A roller 24, FIG. 1A, is installed rotatably in each guide hole 18 at a definite angle with respect to the center axial line of the guide cylinder 21, the center axial line of guide cylinder 21 coinciding with the center axial line of the tightening cylinder 3. A dust-proof rubber seal 25, a seal-pushing ring 26, and a pulling-out circle ring 27 are interposed between the rotary cylinder 17 and the tightening cylinder 3.

Figure 2:
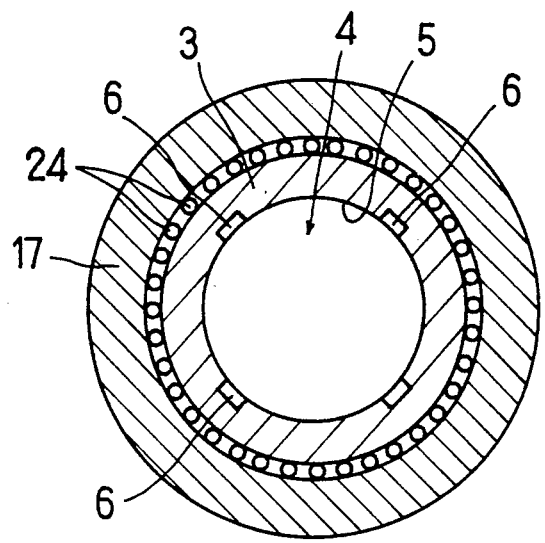
FIG. 2 is a sectional view taken in line II—II of FIG. 1.
Figure 3:
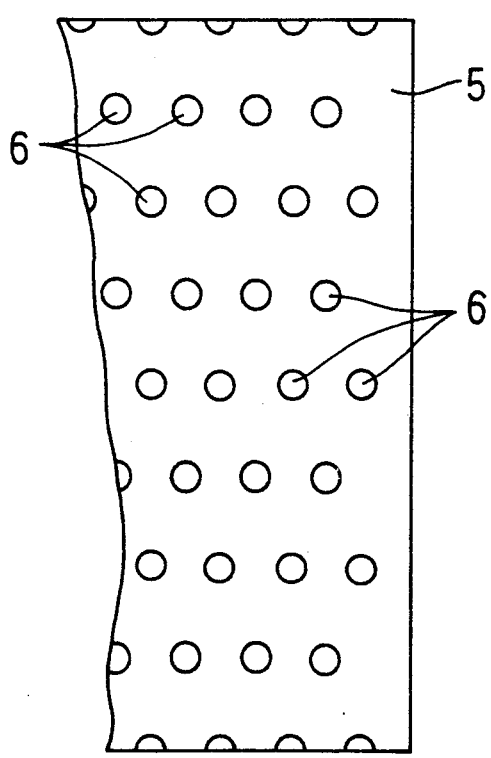
FIG. 3 is a development of an inner circumferential surface of a tightening cylinder.

Next, operation of holding a substance to be held, for example, a cutter (or workpiece) using a chuck device in the abovementioned construction will be described. First, base portion of the cutter is inserted into the insertion hole 4. The rotary cylinder 17 is rotated clockwise in FIG. 2. Because the rollers 24 are guided by the guide cylinder 21 and rotated by rotating the rotary cylinder 17, the rollers 24 roll between the tapered outer circumferential surface 7 of the tightening cylinder 3 and the tapered inner circumferential surface 18 of the rotary cylinder 17 in spiral path towards the larger diameter portion 8 of the tightening cylinder 3. The rotary cylinder 17 advances, in the same direction, towards the larger diameter portion 8. The tightening cylinder 3 is contracted by the rotary cylinder 17 through the rollers 24 and decreases cylinder in diameter. As a result, the tightening surface 5 is closely contacted with the outer circumferential surface of the cutter or workpiece so as to tightly grip such cutter or workpiece.

When the rotary cylinder 17 is rotated and tightening cylinder 3 is contracted, as above described, because of holes 6 on the inner circumferential surface of the tightening cylinder 3, the deflection adaptability of cylinder 3 is high in the direction of tightening cylinder 3, contracting tightening cylinder 3, and with a relatively small force.

Consequently, the force required to rotate rotary cylinder 17 and contracts tightening cylinder 3 may be small. Even if oil adheres to the circumference of the base portion of the piece to be held, the oil can escape into the holes 6 as tightening cylinder 3 is contracted and the inner circumferential surface 5 of the tightening cylinder 3 can contact mechanically and directly, to the circumference of the piece to be held, firmly gripping the held piece.

According to the invention as above described, when the piece is to be held, the base portion of the piece is inserted into insertion hole 4 of the tightening cylinder 3 and the rotary cylinder 17 is rotated and moved towards larger diameter end 8 of the tightening cylinder 3. The tightening cylinder 3 is contracted by the rotary cylinder 17 through the rollers 24 and the base portion of the piece can be tightened and held by the inner circumferential surface 5.

When the rotary cylinder 17 is rotated and the tightening cylinder 3 is contracted, as above described, the strain of the tightening cylinder 3, by contracting the tightening cylinder 3 is absorbed by the number of strain absorbing holes 6 scattered on the inner circumference of the tightening cylinder 3. The deflection adaptability in the direction of the tightening cylinder 3, to be contracted, is high and a relatively small force is sufficient to rotate the rotary cylinder 17 and results in effective operation.

Even when the number of holes 6 are provided to enable the tightening by relatively small force, as above described, the holes 6 are scattered on the inner circumferential surface of the tightening cylinder 3. The inner circumferential surface of the tightening cylinder 3 is substantially continuous throughout the whole circumference and the whole length. Large rigidity is developed against the force to bend the piece to the tightening cylinder 3.

This results in effects that the piece can be held stably and the processing accuracy can be improved, when the machine work is performed using the piece being held (in the case of tool) or when the processing is applied to the piece to be held (in the case of workpiece).

What is claimed is:

1. A chuck device comprising:
  a) a tightening cylinder defining a longitudinal axis and having distal ends and an insertion hole, extending from one of said distal ends of said cylinder along said longitudinal axis to a point intermediate said distal ends of said cylinder, for receiving a tool or workpiece to be held, said tightening cylinder being provided on an outer circumference with a taper surface and on an inner circumferential surface with a number of strain absorbing holes having axes extending radially outwardly from the axis of said tightening cylinder and scattered uniformly in the axial direction and the circumferential direction of said tightening cylinder;
  b) a rotary cylinder externally fitted rotatably to the outside of the tightening cylinder, an inner circumference of said rotary cylinder being formed in a taper surface in parallel to the taper surface on the outer circumference of the tightening cylinder; and
  c) a number of rollers interposed between said tightening cylinder and said rotary cylinder, said rollers being angularly disposed relative to said axis of said tightening cylinder so that the rotary cylinder is moved in the axial direction of said tightening cylinder by said rollers during rotation of said rotary cylinder for tightening said tightening cylinder on a tool or workpiece in said insertion hole when said rotary cylinder is turned in one direction and for loosening said tightening cylinder on said tool or workpiece when said rotary cylinder is turned in an opposite direction.

2. A chuck device as set forth in claim 1, wherein said strain absorbing holes extending radially outwardly on the inner circumferential surface of said tightening cylinder are scattered uniformly in axially, circumferentially and diagonally extending rows with the holes in each row equally spaced from one another and with adjacent rows off set to one another.

3. A support device comprising:
  a) a body provided on a base portion with a connection member;
  b) a tightening cylinder defining a longitudinal axis and having distal ends and an insertion hole, extending from one of said distal ends of said cylinder along said longitudinal axis to a point intermediate said distal ends of said cylinder, for receiving a tool or workpiece to be held, said tightening cylinder being provided on an outer circumference with a taper surface and on an inner circumferential surface with a number of strain absorbing holes having axes extending radially outwardly from the axis of said tightening cylinder and scattered uniformly axially, circumferentially and diagonally extending rows with the holes in each row equally spaced form one another and with adjacent rows off set to one another;
  c) a rotary cylinder externally rotatably fitted to the outside of the tightening cylinder, an inner circumference of said rotary cylinder being formed in a taper surface in parallel to the taper surface on the outer circumference of the tightening cylinder; and
  d) a number of rollers interposed between the tightening cylinder and the rotary cylinder, said rollers being angularly disposed relative to said axis of said tightening cylinder so that said rotary cylinder is moved in the axis direction by said rollers during rotation of said rotary cylinder for tightening said tightening cylinder on a tool or workpiece to be held in said insertion hole when said rotary cylinder is turned in one direction and for loosening said tightening cylinder on said tool or workpiece when said rotary cylinder is turned in an opposite direction.

* * * * *